US007587483B1

(12) United States Patent
Florissi et al.

(10) Patent No.: US 7,587,483 B1
(45) Date of Patent: Sep. 8, 2009

(54) SYSTEM AND METHOD FOR MANAGING COMPUTER NETWORKS

(75) Inventors: Danilo Florissi, Briarcliff Manor, NY (US); Salvatore DeSimone, Woodbury, CT (US); Schmuel Kliger, Chappaqua, NY (US); Chao-Wei Ou, Poughkeepsie, NY (US); Howard H. Green, Carlsbad, CA (US); Martin H. Wexler, San Diego, CA (US)

(73) Assignee: EMC Corporation, Hopkinton, MA (US)

( * ) Notice: Subject to any disclaimer, the term of this patent is extended or adjusted under 35 U.S.C. 154(b) by 247 days.

(21) Appl. No.: 11/240,164

(22) Filed: Sep. 30, 2005

Related U.S. Application Data

(63) Continuation-in-part of application No. 10/171,288, filed on Jun. 12, 2002, now Pat. No. 6,990,520.

(51) Int. Cl.
    *G06F 15/173* (2006.01)
(52) U.S. Cl. .......................... 709/223; 709/200; 703/21
(58) Field of Classification Search ................. 709/223, 709/200, 224; 703/13, 21
    See application file for complete search history.

(56) References Cited

U.S. PATENT DOCUMENTS 6,789,257 B1 * 9/2004 MacPhail .................... 719/316
6,832,249 B2 * 12/2004 Ciscon et al. ............... 709/223
7,039,658 B2 * 5/2006 Starkey ....................... 707/203
7,047,557 B2 * 5/2006 Enomoto ......................... 726/1
2004/0031030 A1 * 2/2004 Kidder et al. ............... 717/172

* cited by examiner

*Primary Examiner*—Salad Abdullahi
*Assistant Examiner*—El Hadji M Sall
(74) *Attorney, Agent, or Firm*—Krishnendu Gupta; Joseph D'Angelo

(57) ABSTRACT

The present invention describes a system and method for managing a complex comprising a reference model store subsystem providing a reference model of the complex, a reference model generation subsystem coupled to the reference model store subsystem, wherein the reference model generation subsystem modifies the reference model to generate a proposed reference model and a change procedure generator subsystem coupled to the reference model store subsystem, wherein the change procedure generator subsystem provides a procedure comprising one or more changes required to transform a complex as represented by a reference model into a complex as represented by the proposed reference model, wherein the change procedure generator subsystem includes a plurality of object templates associated with desired change operations, each of the object templates providing instruction to transform the complex as represented by the reference model into a complex represented by the proposed reference model.

4 Claims, 6 Drawing Sheets

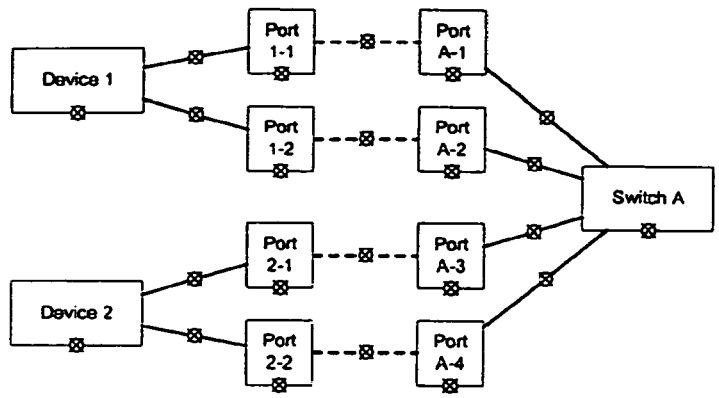
(a) Reference and Operational Models are in agreement
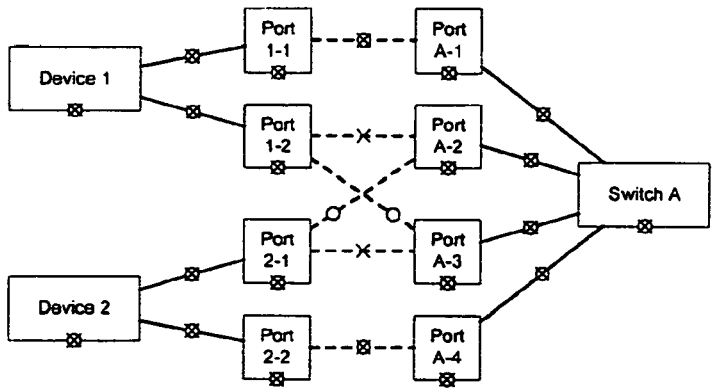
(b) A pair of connections are exchanged in the Operational Model
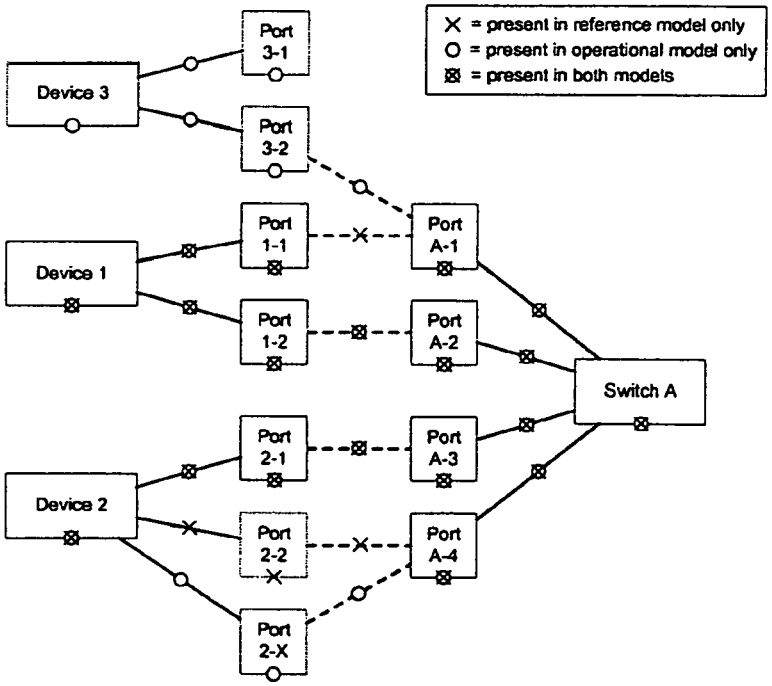
(c) A new device is added, and a port replaced
Figure 2  Composite Model examples

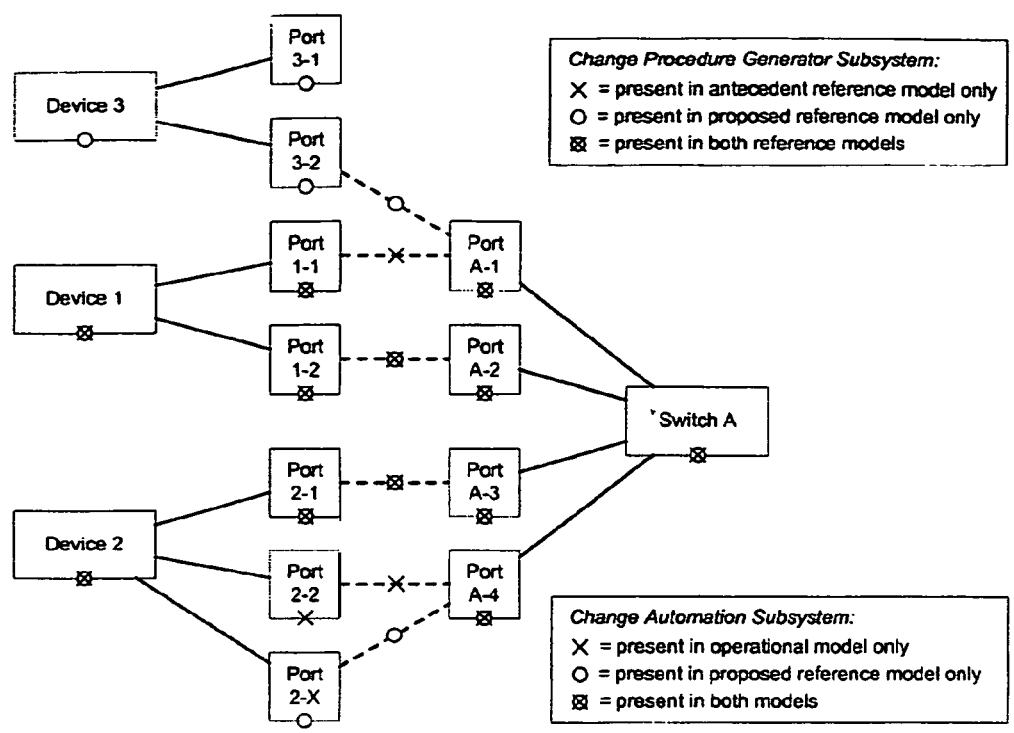
Figure 3 Example for Change Procedure Generator and Change Automation Subsystems

```
Template::T01 {
  LHS = {
    ReplicatedApplication::[Rep_App] {
      Operation = {create},
      Constraints = {
        _Final=False, DiskSize=[DS], MemorySize=[MS], Replicas=[R] } } }
  RHS = {
    Host::[H] {
      Operation = {allocate},
      ConsistsOf = {
        Disk::[D] {
          Operation = {allocate},
          Constraints = {_Final=False, Size >= [DS] }
        },
        Memory::[M] {
          Operation = {allocate},
          Constraints = {_Final=False, Size >= [MS] }
```

FIG. 4B

SYSTEM AND METHOD FOR MANAGING COMPUTER NETWORKS

CLAIM OF PRIORITY

This application is a continuation-in-part, and claims, pursuant to 35 USC 120, the benefit of the earlier filing date, of that patent application entitled "System and Method for Managing Computer Networks," filed Jun. 12, 2002 and afforded Ser. No. 10/171,288, now U.S. Pat. No. 6,990,520 the contents of which are incorporated by reference, herein.

RELATED APPLICATION

This application is related to commonly-owned, concurrently filed entitled "Method and Apparatus for Reference Model Change Generation in Managed Systems," concurrently filed and afforded patent application Ser. No. 11/241,338, the contents of which are incorporated by reference, herein.

FIELD OF THE INVENTION

This invention applies to network and computer systems management, and more specifically, to the management of network-based systems.

BACKGROUND OF THE INVENTION

Enterprise computing facilities have undergone a transformation over the past few decades from comprising one or more large (mainframe) computer systems to containing multiple complexes of networked computer systems. As used here, the term "complex" denotes such a state of affairs. A complex can comprise a collection of physical components that are under common administration, such as networks and associated physical components, such as routers, switches, hubs, repeaters, and end devices attached to the networks. Typical end devices can include servers, special-purpose "appliance" systems and storage systems. Within the context of a complex, physical components can be customized through various configuration parameters to produce specific logical resources (e.g., host systems on servers, or storage volumes on storage systems) or specific behaviors (e.g., access controls or recovery procedures).

The sheer volume and diversity of technologies, components and interconnections in such complexes have imposed well-known challenges in the areas of administration, management and maintenance. The recent advent of specialized networks, such as Storage Area Networks, System Area Networks and Server Area Networks (all of which are referred to as "SANs"), has merely added another dimension to traditional management problems.

Given that a complex consists of many interconnected and individually configured components, a problem can arise of ensuring that the complex is in fact constructed and configured in the ways that its designers intend.

For example, when initially installing or upgrading a complex, there is a need to ensure that the installed complex is a faithful replica of the intended design. This includes verifying that the correct types and quantities of components are in place, and that they are correctly interconnected.

In addition, while a complex is in operation, there is a need to evaluate the effects of changes observed in the complex. For example, if a new device is plugged into a network, it could be an authorized event (e.g., if the device is known to be part of the complex and has recovered following a failure) or an unauthorized event (e.g., the device is not an authorized part of the complex, or is connected to an incorrect network or at an incorrect location on the correct network.

Further, where components of a complex are configurable or programmable (e.g., have options, settings, or adjustments, or contain alterable program material such as firmware) there is a need to ensure that such components are configured or programmed in an acceptable fashion, and to take remedial action if they are not.

Various tools for managing networks and computer systems exist, and many of them incorporate means by which an administrator's intent regarding certain aspects of a network can be recorded and assessed. However, the representation of intentions in existing products has a number of drawbacks. First, the representation of intent is fragmented across multiple sources, and in multiple forms. Often, management products are built as multiple separate domain-specific management systems (e.g., one application for managing storage, another for managing servers, yet another for managing networks) each of which incorporates its own conventions for representing an intended state.

Another drawback relates to the fact that such operations as assigning complex-based resources to particular applications requires visibility across many domains because an application typically requires servers and storage and capacity on multiple networks. Fragmented information, however, makes this analysis more difficult.

As another drawback, the intended state of a network is generally not explicitly represented, or may be ambiguously intermixed with operational data to the extent that distinguishing what is intended and what is merely an artifact of the current state of the complex is difficult or impossible.

Further, many existing management products depend upon an initial discovery operation to assess the content of some domain (e.g., a network, or servers attached to a network), and then to use the results of the discovery to create a database. One drawback to this approach is that elements of the domain that are not present or functioning during discovery may never be entered into the database. Further, elements that are not intended to be part of the domain may be erroneously entered into the database. While the database can be eventually modified into a reasonable representation of the domain's intended state it can only achieve that status by a careful evaluation and editing after the initial discovery operation. This typically requires the on-site services of an expert in the domain, and because the comparison process is manual, is prone to error.

Several models have been designed for constructing management systems over related domains (typically, for network management). For example, typical network managers, such as the OpenView.®. Network Node Manager made by Hewlett Packard Company, perform various discovery and monitoring operations and representations of devices encountered during discovery are placed into a database. Database contents are maintained until removed by an administrator. The database thus records a history describing what elements of a network have been encountered over time. This allows a network administrator to determine when the state of elements within the network have changed.

In this model the results of the discovery operation can differ from an administrator's intent in several ways. First, if a device is not operational at the time discovery is performed, the network complex will not discover it. Second, because not all devices are discovered and recorded, the database may have either too few or too many devices relative to the administrator's intentions. While these network managers typically provide tools to allow an administrator to edit the database (e.g., adding missing devices or deleting extra ones), this manual task is time-consuming and prone to error. In addition, the edit process typically requires substantial expertise on the part of the personnel doing the editing.

SUMMARY OF THE INVENTION

The present invention describes a system and method for managing a complex comprising a reference model store subsystem providing a reference model of the complex, a reference model generation subsystem coupled to the reference model store subsystem, wherein the reference model generation subsystem modifies the reference model to generate a proposed reference model and a change procedure generator subsystem coupled to the reference model store subsystem, wherein the change procedure generator subsystem provides a procedure comprising one or more changes required to transform a complex as represented by a reference model into a complex as represented by the proposed reference model, wherein the change procedure generator subsystem includes a plurality of object templates associated with desired change operations, each of the object templates providing instruction to transform the complex as represented by the reference model into a complex represented by the proposed reference model.

BRIEF DESCRIPTION OF THE DRAWINGS

For a better understanding of the invention, reference is now made to the drawings where like numerals represent similar objects throughout the figures where:

FIGS. 2A-C are schematic views of examples of a composite model subsystem as produced by the Model Comparator subsystem of a complex manager system of the present invention;

FIG. 3 is a schematic view of an example of a combined reference model of a complex manager system of the present invention;

FIG. 4B illustrate an implementation of the change generator representation shown in FIG. 4A.

DETAILED DESCRIPTION

Figure 1A:
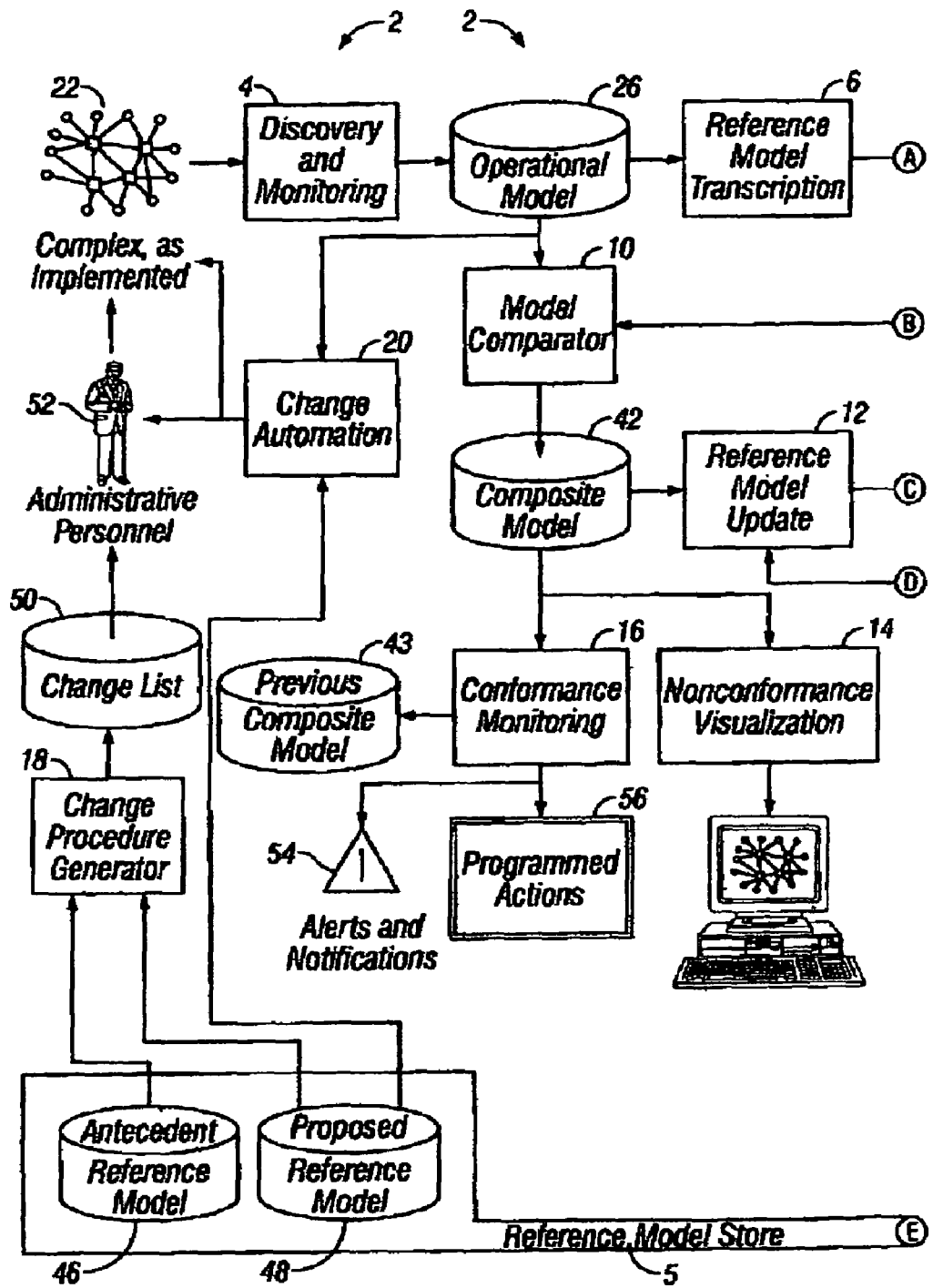
FIG. 1 is a schematic view of a complex management system of the present invention.
Figure 1B:
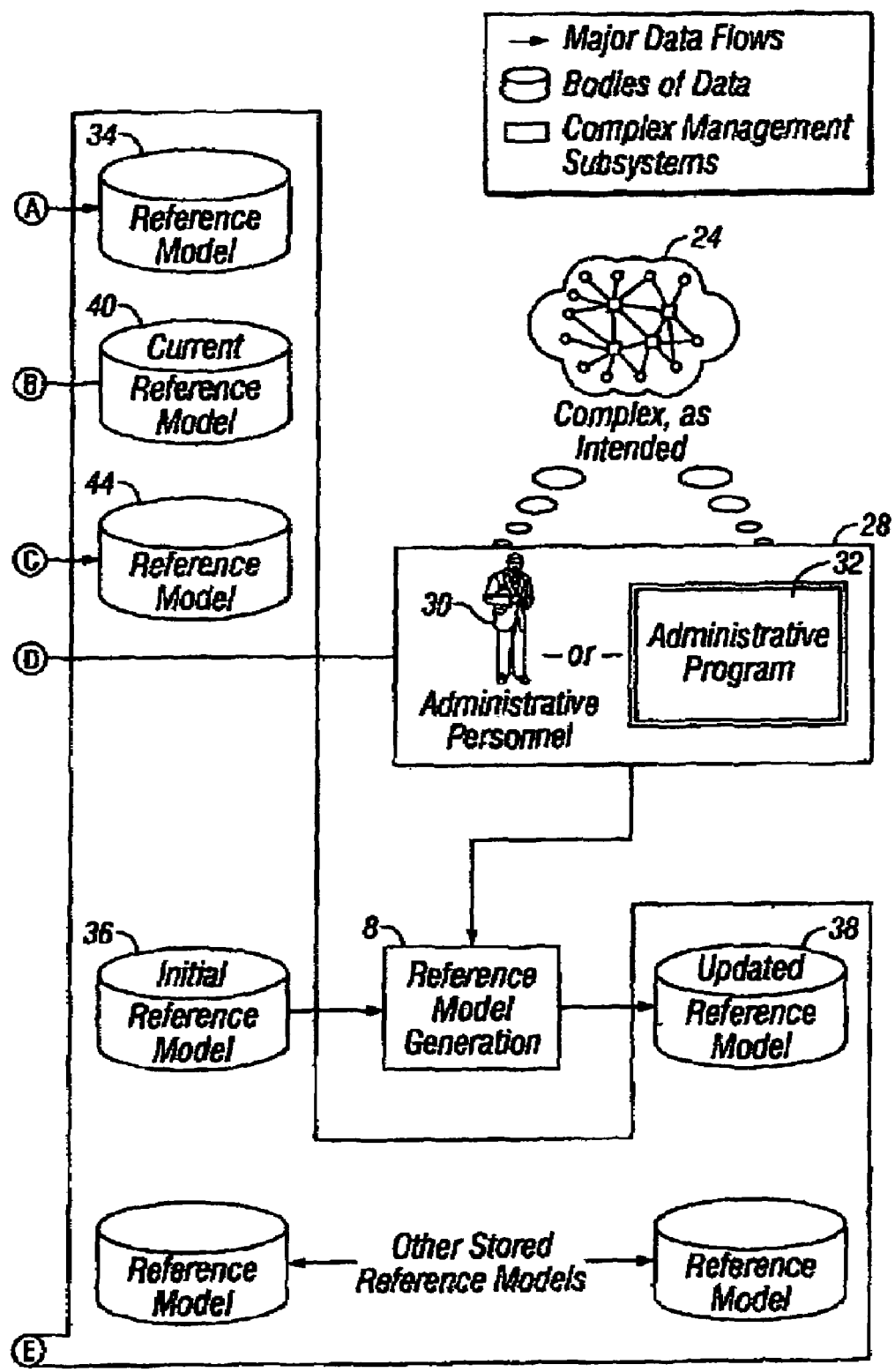

An illustrative embodiment of the complex manager system 2 of the present invention is shown in FIG. 1 (shown as FIGS. 1A and 1B). The complex manager 2 not only analyzes information about a complex's actual state shown as complex, as implemented 22, but also represents, captures and makes use of information regarding how the complex is supposed to be constituted (shown in FIG. 1 as complex, as intended 24). In an embodiment, the complex manager 2 allows administrative clients 28 to develop and record their intentions concerning the correct state of a complex, and to derive various results based on these intentions. In an embodiment, the administrative clients comprise administrative personnel 30 responsible for the design and upkeep of the network, or administrative computer programs 32 or systems acting on their behalf.

More specifically, the requirements of interest here are related to dealing with the intentions of an administrator relating to a complex. For example, a system of the present invention can represent and record the characteristics of a complex that an administrator considers to be necessary to the complex's correct construction and operation and can also verify that the realization of the complex in fact matches the administrator's intentions. Further, the system can alert administrators or take remedial action in the event that discrepancies are found to exist between realized and intended states of a complex. The system can also help administrators to understand the nature or cause of reported discrepancies between the real and intended states of a complex. Further, the system of the present invention assists administrators in making changes to a complex as administrators' intentions regarding the complex change over time. This can involve, for example, representing and recording the intended characteristics of a future or proposed form of a complex; ensuring the completeness and logical consistency of the future or proposed form of a complex; determining what intended characteristics change between a current and future form of a complex; devising a procedure for effecting the changes between a current and future form of a complex; effecting the changes necessary to alter a complex's realization from one intended form to another, and verifying that the changes have been successfully realized.

The complex manager system 2 performs its various functions based upon representations of a complex. In an embodiment, such representations are manifested in a form that is meaningful to computer programs (e.g., a set of memory-based data structures, or a database), and is termed a model of the complex. Because a model is typically a collection of computer-based data, it is subject to any or all of the many operations applicable to such bodies of data. A model can, for example, be permanently stored (as in a disk-based file), retrieved, copied, updated, edited, etc.

A model describes various aspects of a complex's state and in one embodiment, comprises a set of one or more objects. Each object represents some element or component within the complex. For example, objects can include the complex itself; the set of networks within the complex, and for each network, the network components that realize the network, including such developments as network routers, switches, hubs, bridges, protocol converters, and the like; the end devices that are attached to the networks, such as servers, specialized "appliance" or storage systems, and their internal components (e.g., adapters, ports, etc.); the interconnections within the network, as between the network components and end devices, or between network components; and provisioned objects that arise as the result of configuration or programming of the objects above, such as storage volumes, virtual private networks or host systems. Each object within a model contains of a set of attributes, which are elements of data that further define the nature, condition, behavior or state of the object. For example, attributes can define the identity of the object, a level of required firmware, policies describing such behaviors as exception handling or access control, and the enabled/disabled state of ports.

In an embodiment, the complex manager system 2 deals with two distinct types of models: an operational model and a reference model. An operational model is a representation of the actual state of the complex as it existed at some point in time. A reference model is a representation of the intended state of the network.

In an embodiment, the complex manager system 2 is a computer-based system manifested as a set of programmed subsystems that execute on conventional computer systems. Some of these subsystems are dependent on resources or information available only from the complex, and as a consequence execute within computer systems that are part of the complex. However, other subsystems of the complex manager system 2 may depend only on a reference model, and consequently can execute on computer systems that are not part of the complex.

FIG. 1, schematically illustrates the complex manager system 2 and the principal information flows within the system.

In an embodiment, the complex manager system 2 comprises a discovery and monitoring subsystem 4, a reference model store subsystem 5, a reference model transcription system 6, a reference model generation subsystem 8, a model comparator subsystem 10, a reference model update subsystem 12, a nonconformance visualization subsystem 14, a conformance monitoring subsystem 16, a change procedure generator subsystem 18 and a change automation subsystem 20.

The primary task of the discovery and monitoring subsystem 4 is to perform an initial assessment of a complex, as implemented 22, to ascertain the nature and state of all of the complex's networks, network components, and systems attached to the network, as well as the presence, nature, and structure of the interconnections within such networks. On the basis of this information, the discovery and monitoring subsystem 4 constructs an operational model 26 of the complex as implemented 22.

Once the initial operational model 26 has been constructed, the discovery and monitoring subsystem 4 continues to assess the structure and content of the complex, as implemented 22. Through such means as periodically re-executing its discovery process, or by monitoring indications of change emanating from the complex, as implemented 22, the discovery and monitoring subsystem 4 becomes aware of changes in the complex as implemented 22, and updates the operational model 26 accordingly.

The discovery and monitoring subsystem 4 can implement a variety of well-known means to establish the content of the complex, as implemented 22. For example, these means may include such tools as the Simple Network Management Protocol (SNMP); or the Desktop Management Interface (DMI); or the Common Information Model (CIM) technology, as manifested, for example, by Microsoft Corporation's Windows Management Interface; and/or proprietary and/or vendor- or product-specific interfaces intended for retrieving device-related information.

In operation, the discovery and monitoring subsystem 4 first undertakes an initial discovery operation. In an embodiment, this can include sending a "ping" packet to each network address within a prescribed range. This ping packet then elicits a corresponding response packet from the remote device to which it is addressed. For each remote device that returns a "ping" response, the discovery and monitoring subsystem 4 sends further queries, using any or all of the tools above, to determine the nature, internal structure, and operational state of the responding device. In addition, in situations where the responding device has connections to one or more networks, the discovery and monitoring subsystem 4 specifically queries the device to ascertain the set of remote devices with which the responding device is connected.

After the initial discovery operation, the discovery and monitoring subsystem 4 creates one or more objects representing the identified device(s), any device(s) connected to them, and the connections between the device(s). For each device, the representative object contains a set of attributes appropriate to the nature of the object and that describe the identity, nature, and operational state of the device, and its relationships to other devices. For connections between devices, the corresponding object contains the identity of each of the devices involved in the connection. These objects are then stored as part of the operational model 26.

Periodically, for each object in its database, the discovery and monitoring subsystem 4 repeats its queries to the device. If the device fails to respond, the discovery and monitoring subsystem 4 marks the objects corresponding to the device as being non-responsive. If the device does respond, the discovery and monitoring subsystem 4 determines any changes between the device's current state and the state of the device as represented by the stored objects. If changes have occurred, the discovery and monitoring subsystem 4 updates the objects corresponding to the device.

On a periodic basis, the discovery and monitoring subsystem 4 repeats the discovery process by sending a "ping" packet to each network address within a prescribed range. For each network device that responds, the discovery and monitoring subsystem 4 queries the responding device as described above. The discovery and monitoring subsystem 4 then attempts to match the identity of the responding device with corresponding objects. If no corresponding objects exist, the discovery and monitoring subsystem 4 takes note of the newly discovered device by creating and storing representations of these devices.

The reference model store subsystem 5 provides persistent storage for a multiplicity of reference models. The reference model store subsystem 5 acts as a recipient for reference models generated as output by the other subsystems, storing those reference models pending future use. Similarly, the reference model store subsystem 5 acts as a source for reference models used as input by other subsystems.

In an embodiment, the reference model store subsystem 5 can be a computer system's file system, wherein reference models are stored in the form of files.

The reference model transcription subsystem 6 first ensures that the operational model 26 remains in a constant state, and then performs an object-by-object copy of the operational model 26 to create an output reference model 34, which is stored by the reference model store subsystem 5.

The reference model generation subsystem 8 receives as its input a reference model 36 from the reference model store subsystem 5 and allows an administrative client 28 to alter its content to provide an updated reference model 38, which is then stored in the reference model store subsystem 5.

In an embodiment, the reference model generation subsystem 8 can be an "editor" program that graphically displays the content of the reference model, and accepts alterations to the existing reference model 36 from administrative personnel 30 via conventional computer input devices, such as a keyboard or mouse. In another embodiment, the reference model generation subsystem 8 can be a library or similar program manifestation that makes available a programmatically accessible interface (e.g., an application program interface ("API")) that allows an administrative computer program 32 to retrieve and/or make alterations to the content of the existing reference model 36. When the administrative client 28 signals that alterations have been completed, the reference model generation subsystem 8 produces an updated reference model 38 as its output, which is then stored in the reference model store subsystem 5.

In an additional mode of operation, the reference model generation subsystem 8 allows an administrative client 28 to specify the content of a brand new reference model 38. In this embodiment, an initial reference model 36 is not required as input. This mode of operation allows the generation of a new reference model 38 that represents the intended content and structure of a proposed complex, as intended 24 that is not necessarily derived from any existing complex.

In an embodiment, the reference model generation subsystem 8 is a procedural interface, such as an API, that provides an administrative computer program 32 with the ability to query, construct, and alter the content of an existing reference model 36. The API can allow additional functions such as a GUI-based editor program to be constructed. The API of the reference model generation subsystem 8 can provide several services, each of which is typically manifested as a set of one or more procedure calls. For example, the API can provide a service for opening and initializing access to a reference model. This service ensures that a designated reference model is present and valid. As an alternative, when an administrative program 32 wishes to specify a new reference model 36, the initialization service creates a reference model that does not contain any objects. The API can also provide a service for retrieving objects contained in the reference model 36. In an embodiment, variants of this service allow retrieval based on object identity or attribute value, or an enumeration of all objects. Another service allows objects contained in the reference model 36 to be updated. This allows programs using the API to make alterations to the content of specific objects already contained in the reference model 36.

Further, the API can provide a service for adding and/or deleting objects to the reference model 36. The API can also provide a service for committing changes to the reference model 36. This service checks to ensure that any cumulative changes made to the reference model 36 are such that the reference model 36 remains in a consistent state, and makes the changes permanent.

In an embodiment, consistency checks can include ensuring that no two objects have identical identifying information and that references to objects such as connection objects are valid, (i.e., that the object referred to actually exists). The API can also terminate access to the reference model 36.

Typically, the services can be invoked in whatever order is appropriate to the program making use of them, subject to certain restrictions. For example, the service for opening a reference model 36 will typically be invoked first, and will not be invoked again until the service for terminating access has been invoked.

In addition, the service for committing changes will normally be invoked after changes to the reference model 36 have been made. Also, services that change the reference model 36 will not be invoked between the last invocation of the service for committing changes, and the invocation for terminating access. Finally, the service for terminating access will usually be the last service invoked.

The model comparator subsystem 10 receives a reference model 40 from the reference model store subsystem 5 and an operational model 26 as inputs, compares the operational model 26 and the reference model 40, and generates a composite model 42 as its output. The composite model 42 contains a set of objects that represent the union of the sets of objects contained in the current reference model 40 and the operational model 26. The model comparator subsystem 10 assesses the degree to which the complex, as implemented 22 conforms to the content and structure of the complex, as intended 24.

In an embodiment, objects in the composite model 42 have the same content as their counterparts in the operational model 26 or reference model 40, but additionally contain two boolean state elements, designated as the reference flag and the operational flag.

In operation, for each object in the reference model 40, the model comparator subsystem 10 constructs a corresponding object in the composite model 42 with the same attributes as the object in the reference model 40 and asserts that object's reference flag. For each object in the operational model 26, the model comparator subsystem 10 retrieves the object's identity from the operational model 26. The model comparator subsystem 10 then searches the objects in the composite model 42 to determine if an object already exists with the same identity. If the model comparator subsystem 10 finds an object in the composite model 42 that has the same identity, it asserts that object's operational flag. If the model comparator subsystem 10 does not find an object in the composite model 42 that has the same identity, it creates an object in the composite model 42 with the same attributes as the object in the operational model 26 object, and asserts that object's operational flag.

When both the reference model 40 and the operational model 26 have been processed, objects in the composite model 42 are each marked in one of three ways. In the first case, both the reference flag and the operational flag are asserted. In this case, the object is in conformance with the reference model 40. In the second case, only the reference flag is asserted. In this case, the object is present in the reference model 40, but is not accounted for by the operational model 26. Thus, the entity represented by the object is not present (or could not be detected) within the complex, as implemented 22. In the third case, only the operational flag is asserted. In this case, the object is not known within the reference model 40, but is present in the operational model 26. While the entity corresponding to that object is present within the complex, as implemented 22, it is not supposed to be present as defined in the complex, as intended 24.

FIGS. 2a-c depict several examples of a composite model 42. FIG. 2a depicts a composite model 42 for a complex involving two end-devices (Devices 1, 2), each containing two ports (Ports 1-1, 1-2, 2-1, 2-2), and a switch device (Switch A) containing four ports (Ports A-1, A-2, A-3, A-4). In these examples, the reference and operational flags are represented in their asserted states by the presence of an "X" or "O" or both, respectively. An "X" indicates that an object is present in the reference model 40 only, an "O" indicates that an object is present in the operational model 26 only, and an "{circle over (x)}" indicates the object is present in both the reference model 40 and the operational model 26.

FIG. 2b assumes the same underlying reference model 40 as FIG. 2a, but represents a situation where the connections between Ports 1-2 and A-2 and Ports 2-1 and A-3 have been reversed. The actual observed connections as reported by the operational model 26 are between Ports 1-2 and A-3, and Ports 2-1 and A-2.

FIG. 2c illustrates a slightly more complex scenario. In this example, Device 3 is not part of the reference model 40, but is nonetheless present within the complex, as implemented 22. One of its ports (Port 3-2) has been connected to Port A-1 in the place of Port 1-1. Device 2 is present, but has had one of its ports (Port 2-2) replaced by another (Port 2-X).

The reference model update subsystem 12 receives as input a composite model that indicates the nonconforming aspects of a complex, as implemented 22 as produced by the model comparator subsystem 10. The reference model update subsystem 12 allows an administrative client 28 to designate that specific nonconforming aspects of the complex, as implemented 22, do in fact, represent the intended state of the complex. Equivalently, the reference model update subsystem 12 allows an administrative client 28 to specify that selected parts of the reference model 40 are incorrect, whereas selected parts of the actual complex, as implemented 22 as represented by the operational model 26 are correct. In response, the reference model update subsystem 12 makes appropriate updates, and produces an updated reference model 44 as its output, which is then stored by the reference model store subsystem 5.

In operation, the reference model update subsystem 12 first accepts from an administrative client 28 indications that specify a set of objects within the composite model 42. In an embodiment, a human administrator can select objects through a graphical user interface ("GUI").

In an embodiment, the reference model update subsystem 12 selects additional objects by a set of rules. First, selection of an object that represents a connection causes the selection of the objects connected by the connection object. For example, as shown in FIG. 2B, selecting the connection object between Port 1-2 and Port A-3 causes the selection of Ports 1-2 and A-3. Second, selection of a port object causes selection of all connection objects that reference the port object. Thus, in FIG. 2c, selection of Port A-1 causes the selection of the connection objects between Port A-1 and Port 3-2, and between Port A-1 and Port 1-1. Third, selection of an object that is part of a containment hierarchy causes selection of all higher-level objects in the hierarchy. For example, if Port 3-2 is selected in FIG. 2c, Device 3 would also be selected. Finally, selection propagation occurs repetitively until no additional objects are selected.

The reference model update subsystem 12 then generates an output reference model 44. The reference model update subsystem 12 creates objects in the output reference model 44 that reflect objects in the composite model 42 in accordance with a set of rules. If an object in the composite model 42 is selected and the object's operational flag is asserted, it is copied to the output reference model 44. If an object in the composite model 42 is not selected and the object's reference flag is asserted, it is also copied to the output reference model 44. In this example, objects not meeting these conditions are not copied to the output reference model 44.

The nonconformance visualization subsystem 14 receives as input a composite model that describes the nonconforming aspects of a complex, as implemented 22 as provided by the model comparator subsystem 10, and renders a visual display illustrating the differences between the complex, as implement 22 and the complex, as intended 24. In one embodiment, the nonconformance visualization subsystem 14 provides the visual display on a computer monitor.

In an embodiment, the technology for visually displaying representations of networked devices by the nonconformance visualization subsystem 14 can take such forms as tree and topological representations. In conjunction with using this technology, the nonconformance visualization subsystem 14 adds information to indicate the conformance state of elements of a complex.

In operation, the nonconformance visualization subsystem 14 determines its displays from a composite model 42 that it receives from the model comparator subsystem 10. Using reference and operational flags found in objects from the composite model 42, the nonconformance visualization subsystem 14 adds adornments or effects to a display of all or part of a complex to call attention to such nonconforming aspects. In one embodiment, these effects can include special colors or shapes.

A conformance monitoring subsystem 16 periodically invokes the model comparator subsystem 10, using as its input the operational model 26 maintained by the discovery and monitoring subsystem 4 and a reference model 40 retrieved from the reference model store subsystem 5. The reference model 40 is designated by an administrative client 28 as representing the state of the complex, as intended 24. The conformance monitoring subsystem 16 then examines the composite model 42 output by the model comparator subsystem 10 for nonconforming aspects of the complex, as implemented 22. Whenever any aspect is first discovered to be nonconforming, or first ceases to be nonconforming, the conformance monitoring subsystem 16 performs an action based on the nature of the nonconformance.

The conformance monitoring subsystem 16 allows an administrative client 28 to identify the specific action to be taken in the event that a nonconformance situation is detected. For example, an administrative client 28 can specify a predetermined action to be performed by the conformance monitoring subsystem 16 such as generating an alarm indication, sending an event notification to another program, or sending an electronic mail message to a responsible party (shown in FIG. 1 as alerts and notifications 54). Alternatively, an administrative client 28 can specify an action to execute a certain program or script (shown in FIG. 1 as programmed actions 56). Thus the administrative client 28 can devise actions that are customized to the specific nonconformance situation.

During the initial stages of its operation, the conformance monitoring subsystem 16 invokes the model comparator subsystem 10 to compare the current reference model 40 with the operational model 26. The conformance monitoring subsystem 16 receives as an input a composite model 42 that contains indications of any nonconforming elements of the complex, as implemented 22. The conformance monitoring subsystem 16 retains a copy of this composite model 42 as the previous composite model 43. At the end of a predetermined waiting period, the conformance monitoring subsystem 16 again invokes the model comparator subsystem 10 to compare the current reference model 40 with the current state of the operational model 26. As a result, the conformance monitoring subsystem 16 then receives an updated instance of the composite model 42.

Next, the conformance monitoring subsystem 16 compares the previous composite model 43 and the updated composite model 42. First, for each object in the previous composite model 43, the conformance monitoring subsystem 16 searches for a corresponding object in the updated composite model 42.

Second, if the conformance monitoring subsystem 16 succeeds in locating a corresponding pair of objects, it compares their respective states of conformance. If there is a difference in conformance state (i.e., the object in one model is in conformance and the other is not) the conformance monitoring subsystem 16 performs actions on the basis that the object has transitioned to or from a conforming state, as appropriate. However, if both objects are in a similar conformance state (i.e., both are conforming or both are non-conforming) nothing has changed, so the conformance monitoring subsystem 16 takes no further action for that object.

Third, if the conformance monitoring subsystem 16 discovers that an object is in one, but not both, of the composite models, that object must be non-conforming. For an object to be in conformance, it must be in the current reference model 40. Because all objects of the current reference model 40 are incorporated within each composite model 42 by the model comparator subsystem 10, any object in the current reference model 40 will always be present in any instance of the composite model 42. If an object is not in both the updated composite model 42 and the previous composite model 43, it cannot have been in the current reference model 40, and thus, cannot be in conformance. If the object is in the updated composite model 42, but not in the previous composite model 43, the conformance monitoring subsystem 16 performs actions on the basis that the nonconforming object has appeared in the complex, as implemented 22. If the object is in the previous composite model 43 but not in the updated composite model 42, the conformance monitoring subsystem 16 performs actions on the basis that the nonconforming object has been removed from the complex, as implemented 22. The conformance monitoring subsystem 16 then discards the previous composite model 43 and creates a new instance of the previous composite model 43 by copying the updated composite model 42, and begins waiting for a predetermined period as it repeats this process.

The change procedure generator subsystem 18 receives as input two reference models 46 and 48. The antecedent reference model 46 represents the state of a complex, as intended 24, at one point in time. The proposed reference model 48 represents a future state of the complex, as intended 24. In one embodiment, the antecedent reference model 46 may be empty, thus representing the state of a complex which has not yet been constructed. In another embodiment, the antecedent reference model 46 may be the reference model 34 produced as the output of the reference model transcription subsystem 6, thus representing the current state of the complex, as implemented 22. In a further embodiment, the antecedent reference model 46 may be one future state of the complex, as intended 24, and the proposed reference model 48 may be a subsequent future state of the complex, as intended 24, thus representing one increment of a progression of anticipated alterations to the complex. The change procedure generator subsystem 18 compares the antecedent reference model 46 and the proposed reference model 48 and discerns the differences between them. It then calculates an ordered list of changes 50 to the complex, as represented by the antecedent reference model 46, that are required to transform that complex to the complex as represented by the proposed reference model 48.

In an embodiment, this list of changes 50 can be manifested as a printed list of step-by-step instructions to be followed by administrative personnel 52 to effect the desired changes to the complex, as implemented 22.

In operation, the change procedure generator subsystem 18 first generates a combined reference model that effectively represents the union of the sets of objects in the antecedent reference model 46 and the proposed reference model 48. Objects in the combined reference model have the same content as their counterparts in the antecedent reference model 46 and/or the proposed reference model 48, but additionally contain two state elements. The first state element describes the type of change to be made to the object. It can assume values symbolically representing that the object is an addition to, a deletion from, or unchanged with respect to the antecedent reference model 46. The second state element represents the status of the object with respect to the change generation processing.

FIG. 3 demonstrates an example of a visual representation of the combined reference model for a simple complex. In this example, Device 3 with Ports 3-1 and 3-2 is being added, Port 2-2 is being removed and replaced by Port 2-x, and Port 3-2 is replacing Port 1-1 as the port connected to Port A-1.

The change procedure generator subsystem 18 analyzes the combined reference model under the control of a set of rules. Each rule describes a set of conditions that apply to one or more of the objects of the combined reference model, and also contains a set of actions. If the state of the objects in the combined reference model fulfill a rule's conditions, the rule is activated and placed on a list for execution. Activated rules are selected from the list, and executed by invoking the rule's actions.

In operation, for each object in the antecedent reference model 46, the change procedure generator subsystem 18 constructs a corresponding object in the combined reference model with similar attributes, sets that object's first state element to a configuration signifying that the aspect of the complex represented by the object is to be removed from the complex, and sets the second state element to indicate that processing has not yet commenced on the object. For each object in the proposed reference model 48, the change procedure generator subsystem 18 retrieves the object's identity. It then searches the objects in the combined reference model to determine if an object already exists that has the same identity. If the change procedure generator subsystem 18 finds an object in the combined reference model that has the same identity, it sets that object's first state element to a configuration signifying that the aspect of the complex represented by object does not change. If the change procedure generator subsystem 18 does not find an object that has the same identity, it creates a new object in the combined reference model with the same attributes as the object in the proposed reference model 48. It also sets that object's first state element to a configuration signifying that the aspect of the complex represented by the object is being added to the complex, and initializes the second state element to indicate that processing has not yet commenced on the object.

The change procedure generator subsystem 18 processes the combined reference model in accordance with its rules. A rules engine implements rules that apply to the conditions present in the combined reference model. Rule conditions examine the types and relationships of the objects in the combined reference model, and more particularly examine the state of the two state elements. Typical actions involve changing the state of a selected object or generating an output describing a needed change to the complex.

Table 1 provides a set of rules sufficient to generate the list of changes 50 for an example complex. In this example, each rule takes the form of an "if-then" instruction. Conditions for the rule appear between the "if" and the "then", and the actions follow the "then". The rules incorporate several behaviors conducive to effectively altering a complex, as implemented 22. For example, if a device port needs to be altered, the device must be turned off first. Also, while a port cannot be connected until it has been installed in a device, existing connections can be removed at any time. Finally, a new device typically has ports already installed, so their presence needs only to be verified.

In the example shown in Table 1, the first state element is called Action and the second state element is called State. The Action state element can assume values symbolically represented as Add, Remove or NoChange, while the State element assumes the value of Initial.

Within Table 1, the term "is being added" is used to test that an object's Action state element is set to Add; the term "is being removed" is used to test that the object's Action state element is set to Remove; and the term "is not being added or removed" is used to test that the object's Action state element is set to NoChange.

In this example, the rules assume that the combined reference model meets various consistency rules, such as if a connection object exists, both of the objects it connects also exist; if a device is being removed, then its ports are being removed as well; and connections to ports being removed are being removed as well. Further, the rules are listed in order of priority. If more than one rule is activated at a given time, only the rule with highest priority will be implemented.

TABLE 1

Example rule set

| # | Rule |
|---|---|
| 1 | ; ; if a device is to be added, make it accessible to the Complex Manager<br>If a device is being added<br>    and the device is in the Initial state,<br>then output "Make the device accessible"<br>    and set the device's state to Complete. |
| 2 | ; ; if a device has been added, verify that its ports are present<br>If a port is being added<br>    and the port's device is being added<br>    and the port's device is in the Complete state<br>    and the port is in the Initial state<br>then output "Verify the port's presence"<br>    and set the port's state to Complete. |
| 3 | ; ; if an existing device has ports to be altered, turn the device off<br>If a device is not being added or removed<br>    and the device is in the Initial state<br>    and the device has any ports<br>where the port is being added or removed<br>and the port is in the Initial state<br>then output "Turn the device off" and set the device's state to Off |
| 4 | ; ; if a port is to be removed, ensure that it's disconnected first.<br>If a port is being removed<br>    and the port is in the Initial state<br>    and there exist connections that reference the port where the connection is in the Initial state<br>    and the port's device is in the Off state,<br>then output "Disconnect the connection" and set the connection's state to Complete |
| 5 | ; ; if a port needs to be removed and the device is off, remove the port.<br>If a port is being removed<br>    and the port is in the Initial state<br>    and there exist no connections to the port<br>    and the port's device is in the Off state,<br>then output "Remove the port from the device" and set the port's state to Complete. |
| 6 | ; ; if a port needs to be added and the device is off, add the port.<br>If a port is being added<br>    and the port is in the Initial state<br>    and the port's device is in the Off state,<br>then output "Install the port in the device" and set the port's state to Complete. |
| 7 | ; ; if a device has had all of its ports altered and is off, turn it back on<br>If a device is in the Off state<br>    and the device has no ports where the port is being added or removed<br>    and the port is Initial state<br>then output "Turn the device on" and set the device's state to Complete. |
| 8 | ; ; Get rid of connections that are being removed<br>If a connection is being removed<br>    and the connection is in the Initial state<br>then output "Disconnect the connection" and set the connection's state to Complete. |
| 9 | ; ; Add connections that need to be added, but only if the ports that it connects<br>; ; are in an acceptable state<br>If a connection is being added<br>    and the connection is in the Initial state<br>    and each of the connection's ports is either being added or removed<br>    and the port is in the Complete state<br>    or is not being added or removed<br>then output "Add the connection"<br>    and set the connection's state to "Complete" |
| 10 | ; ; Just check off ports from a device that is being removed<br>If a port is being removed<br>    and the port is in the Initial state<br>    and the port's device is in the Initial state<br>    and all connections to the port are in the Complete state<br>then set the port's state to Complete |
| 11 | ; ; if a device is to be removed, make it inaccessible.<br>If a device is being removed<br>    and all of the device's ports are in the Complete state<br>    and its state is Initial,<br>then output "Make the device inaccessible"<br>    and set the device's state to Complete |
| 12 | ; ; check for completion<br>If all objects that are being added and removed are in state Complete, then output "All done." |

TABLE 2

Example rule execution sequence for the complex in FIG. 3

| Rule | Object | Old State | New State | Output |
|---|---|---|---|---|
| 1 | Device # | Initial | Complete | Make the device accessible |
| 2 | Port 3-1 | Initial | Complete | Verify the port's presence |
| 2 | Port 3-2 | Initial | Complete | Verify the port's presence |
| 3 | Device 2 | Initial | Off | Turn the device off |
| 4 | Connection 2-2 | Initial | Complete | Disconnect the connection |
| 5 | Port 2-2 | Initial | Complete | Remove the port from the device |
| 6 | Port 2-X | Initial | Complete | Install the port in the |
| 7 | Device 2 | Off | Complete | Turn the device on |
| 8 | Connection 1-1 to A-1 | Initial | Complete | Disconnect the connection |
| 9 | Connection 2-X to A-4 | Initial | Complete | Add the connection |
| 9 | Connection 3-2 to A-1 | Initial | Complete | Add the connection |
| 12 | (none) | | | All done |

The change automation subsystem 20 receives as input a proposed reference model 48 representing a future complex, as intended 24 and an operational model 26 provided by the discovery and monitoring subsystem 4. The change automation subsystem 20 then automatically effects the changes required to transform a complex, as implemented 22 into that represented by the proposed reference model 48.

When the change automation subsystem 20 detects a change, such as adding or removing physical devices, or altering physical interconnections between devices, it operates in a different mode, prompting administrative personnel 52 to make the specific changes.

In an embodiment, as part of its change process, the change automation subsystem 20 monitors the operational model 26 provided by the discovery and monitoring subsystem 4 to verify that changes have been properly implemented.

In operation, the change automation subsystem 20 starts its operation by constructing a consolidated model containing a set of objects that represents the union of the sets of objects found in the proposed reference model 48 and the operational model 26. Objects in the consolidated model derive content about the current real-world state of the object from the operational model 26, and about the intended state of the object from the proposed reference model 48. Additionally, each object in the consolidated model contains several state elements used by the change automation subsystem 20.

These state elements include a "Present" flag, which when asserted indicates that the object's real-world counterpart has (recently) been discovered to exist; an "Intended" flag, which when asserted indicates that the object is part of the complex, as intended 24; a state element designated as "State," which represents the status of the object with respect to processing by the change automation subsystem 20. State is set to an initial value symbolically designated as "Initial," and is set to a value of "Done" when processing of the object is believed to be complete. The State state element can assume other values as directed by the change automation subsystem 20 to represent the status of the object with respect to the processing by the change automation subsystem 20.

In an embodiment, the procedure followed by the change automation subsystem 20 is as follows. First, for each object in the proposed reference model 48, the change automation subsystem 20 constructs an object with the same identity in the consolidated model, with that object's Intended flag asserted, Present flag negated, and State state element set to Initial. For each object in the operational model 26, the change automation subsystem 20 retrieves the object's identity from the object in the operational model 26. The change automation subsystem 20 then searches the objects in the consolidated model to determine if an object exists that has the same identity. If the change automation subsystem 20 discovers an object in the consolidated model with the same identity as an object in the operational model 26, the change automation subsystem 20 asserts the object's Present flag. If the change automation subsystem 20 does not find an object in the consolidated model with the same identity as an object in the operational model, the change automation subsystem 20 creates a new object in the consolidated model with the object's Present flag asserted and Intended flag negated, and the State state element set to Initial.

The change automation subsystem 20 processes the consolidated model as directed by a set of rules. In an embodiment, the set of rules follows the form described above for the change procedure generator subsystem 18. Whenever conditions specified by a rule are met, the change automation subsystem 20 then executes an appropriate action.

In an embodiment, the actions can include making a request to perform an alteration to the complex, as implemented 22, generally to the element in the complex, as implemented 22 that the object represents; displaying a message for the administrative personnel 52, such as on a visual display device, or accepting input from the administrative personnel 52, as via a keyboard; changing the value of the object's State state element; or indicating that processing has completed.

In an embodiment, requests made by the change automation subsystem 20 to alter the complex, as implemented 22 comprise two general types. First, if the request can be carried out by programmatic means, the change automation subsystem 20 directly invokes the necessary functions to request that the action be carried out. Requests in this category include, for example, alterations to software-managed configuration information, and turning a device's power off or on.

Second, if the request requires manual intervention for the action to be carried out, the change automation subsystem 20 displays instructions regarding the change in a human-readable form, such as on a video display device. Administrative personnel 52 then implement the requested actions, and signify the change automation subsystem 20, via an input device such as a keyboard, after the action has been completed. Requests in this category can include, for example, altering physical connections within the complex, as implemented 22, or changing a device's hardware configuration.

In an embodiment, the change automation subsystem 20 periodically updates the consolidated model to reflect recent changes in the state of the complex, as implemented 22. The change automation subsystem 20 first suspends rule processing. Next, the change automation subsystem 20 acquires updated information about the complex, as implemented 22 by retrieving a updated operational model 26 from the discovery and monitoring subsystem 4. For each object in the consolidated model, the change automation subsystem 20 resets the object's Present flag. For each object in the operational model, the change automation subsystem 20 retrieves the object's identity from the updated object from the operational model 26. It then searches the objects in the consolidated model to determine if an object exists that has the same identity. If the change automation subsystem 20 discovers an object in the consolidated model with the same identity as an object in the operational model, the change automation subsystem 20 asserts the object's Present flag. If the change automation subsystem 20 does not find an object in the consolidated model with the same identity as an object in the operational model 26, the change automation subsystem 20 creates a new object in the consolidated model and asserts the object's Present flag, resets the object's Intended flag, and sets the object's State state element to Initial.

As described above, the change automation subsystem 20 continues processing rules and making updates to the consolidated model until a rule is executed indicating that all changes have been successfully completed.

Table 3 contains a sample implementation of a set of 10 rules for a change automation subsystem 20. These rules follow the same conventions described above for those of the change procedure generator subsystem 18 above.

TABLE 3

Sample rules for the change automation subsystem 20

| | Rules relating to devices |
|---|---|
| D-1 | if a device is not Intended and not Present then Set the device's state to Done |
| D-2 | If a device is not Intended and Present And the device is in the Initial or Done state Then Make a request to remove the device Set the device's state to Removing |
| D-3 | If a device is not Present And the device is in the Removing state Then Set the device's state to Done |
| D-4 | If a device is Intended and not Present And the device's state is Initial Then Make a request that the device he made available Set the device's state to Finding |
| D-5 | If a device is Present And the device's state is Initial or Finding And all of the device's ports are in the Ready state Then Set the device's state to Verify |
| D-6 | If a device is Present And the device's state is Verify And all ports are in the Done state Then Set the device's state to Done |
| D-7 | If a device is Present And the device's state is Verify And all ports are in the Done or ToBeAdded or ToBeRemoved states And any port is in the ToBeAdded or ToBeRemoved state Then Make a request to turn off the device's power Set the device's state to PoweringOff |
| D-8 | If a device is not Present And the device is in the Poweringoff state Then Set the device's state to PowerOff |
| D-9 | If a device is in the PowerOff state And all ports are in the Ready state Then Make a request to turn the device's power on Set the device's state to PoweringOn |
| D-10 | If a device is Present And the device is in the PoweringOn State Then Set the device's state to Verify |
| # | Rules relating to ports |
| P-1 | If a port is in the Initial state Then Set the port's state to Ready |
| P-2 | If a port is Intended and Present, or not Intended and not Present And the port is in the Ready state And the port's device is in the Verify state Then Set the port's state to Done |
| P-3 | If a port is in the Done state And the port's systen is in the Poweroff state Then Set the port's state to Ready |
| P-4 | If a port is Intended and not Present And the port is in the Ready state And the port's device is in the Verify state Then Set the port's state to ToBeAdded |
| P-5 | If a port is not Intended and Present And the port is in the Ready state And the port's device is in the Verify state Then Set the port's state to Disconnecting |

TABLE 3-continued

Sample rules for the change automation subsystem 20

| | |
|---|---|
| P-6 | If a port's state is Disconnecting And all of the port's connections that are Present are in the Disconnect state Then Set the port's state to ToBeRemoved |
| P-7 | If a port is in the ToBeRemoved or ToBeAdded state And none of the port's connections are in the Disconnect state And the port's device is in the PowerOff state Then If the port is Intended Make a request to add the port else Make a request to remove the port Set the port's state to Changing |
| P-8 | If a port is in the Changing state And the administrator has signified that the change was completed Then Reset ChangeComplete Set the port's state to Ready |
| # | Rules relating to connections |
| C-1 | If a connection is Intended and Present or not Intended and not Present And the connection is in the Initial state And the connection's ports are in the Done state Then |
| C-2 | If a Connection is Intended and not Present or not Intended and Present And the connection is in the Initial or Done state And the connection's ports are in the Done state Then If the connection is Intended Make a request to connect the ports else Make a request to disconnect the ports Set the connection's state to Initial |
| C-3 | If a connection is not Intended and Present And the connection is in the Initial state And any of the connection's ports are in the Disconnecting state Then Set the connection's state to Disconnect |
| C-4 | If a connection is in the Disconnect state And any of the connection's ports is in the ToBeRemoved state Then Request that the connection be removed Set the connection's state to Initial |
| # | Object-nonspecific rules |
| X-1 | If all objects are in the Done state Then Terminate processing. |

Table 4 provides a trace of an exemplary execution of the rules shown in Table 3 as applied to a scenario, such as that shown in FIG. 3.

In addition, a substantial number of additional rule firings occur as the result of processing objects that are not changed in the example (for example, devices Device-1 and Switch-A and their respective ports). Typically, these objects execute only a single transition, from Initial state to Done and are not shown.

TABLE 4

Example rule execution for the Complex shown in FIG. 3

| Rule | Object | PreSent Flag | Old State | New State | Action |
|---|---|---|---|---|---|
| P-1 | Ports 3-1, 3-2 | Y | Initial | Ready | |
| D-4 | Device-3 | N | Initial | Finding | Request that the device be made available |
| P-1 | Ports 2-1, 2-2, 2-X | — | Initial | Ready | |
| D-5 | Device-2 | Y | Initial | Verify | |
| P-2 | Port 2-1 | Y | Ready | Done | |
| P-4 | Port 2-x | N | Ready | ToBeAdded | |
| P-4 | Port 2-2 | — | Ready | Disconnecting | |
| C-3 | Connection 2-2 A-4 | Y | Initial | Disconnecting | |
| P-6 | Port 2-2 | Y | Disconnecting | ToBeRemoved | |
| D-7 | Device-2 | Y | Verify | PoweringOff | Power off device-2 |
| C-4 | Connection 2-2 A-4 | — | Disconnect | Initial | Remove Connection 2-2 A-4 |

In this example, no further rule firings are possible until something is changed within the complex. When the Device-2 power-off sequence has been completed, this event is presumed to be reflected by the removal of Device-2 from the Operational Model, and the consequent negation of the Present flag of the Device-2 in the Consolidated Model.

| | | | | | |
|---|---|---|---|---|---|
| D-8 | Device-2 | N | PoweringOff | PowerOff | |
| P-3 | Port 2-1 | N | Done | Ready | |
| P-6 | Port 2-2 | N | ToBeRemoved | Changing | Request to remove the port |
| P-6 | Port 2-X | N | ToBeAdded | Changing | Request to add the port |

Again, no further firings are immediately possible. An administrator can now proceed either by making Device-3 available, or by changing the ports in Device-2. In this example, assume that the administrator makes and acknowledges the port changes in Device-2.

| | | | | | |
|---|---|---|---|---|---|
| P-8 | Port 2-2 | N | Changing | Ready | |
| P-8 | Port 2-X | N | Changing | Ready | |
| P-3 | Port 2-1 | N | Done | Ready | |
| D-9 | Device-2 | N | PowerOff | PoweringOn | Power on Device-2 |

The process will wait for Device-2 to become available, which will be reflected in the Operational Model, and ultimately in Device-2's Present flag.

| | | | | | |
|---|---|---|---|---|---|
| D-10 | Device-2 | Y | PoweringOn | Verify | |
| P-2 | Port 2-1 | Y | Ready | Done | |
| P-2 | Port 2-2 | N | Ready | Done | |
| P-2 | Port 2-X | Y | Ready | Done | |
| D-6 | Device-2 | Y | Verify | Done | |
| C-2 | Connection 2-X A-4 | N | Initial | Initial | Add Connection 2-X A-4 |

After an administrator establishes the connection between ports 2-X and A-4, the Operational Model, and ultimately, the Consolidated Model, are updated to reflect that connection.

| | | | | |
|---|---|---|---|---|
| C-1 | Connection | Y | Initial | Done |

In this example, assume that Device-3 was installed, configured and connected corrected and made available.

| | | | | |
|---|---|---|---|---|
| D-5 | Device-3 | Y | Finding | Verify |
| P-1 | Port 2-1 | Y | Ready | Done |
| P-1 | Port 3-2 | Y | Ready | Done |
| D-6 | Device-3 | Y | Verify | Done |
| X-1 | (none) | | | | Change complete |

Figure 4A:
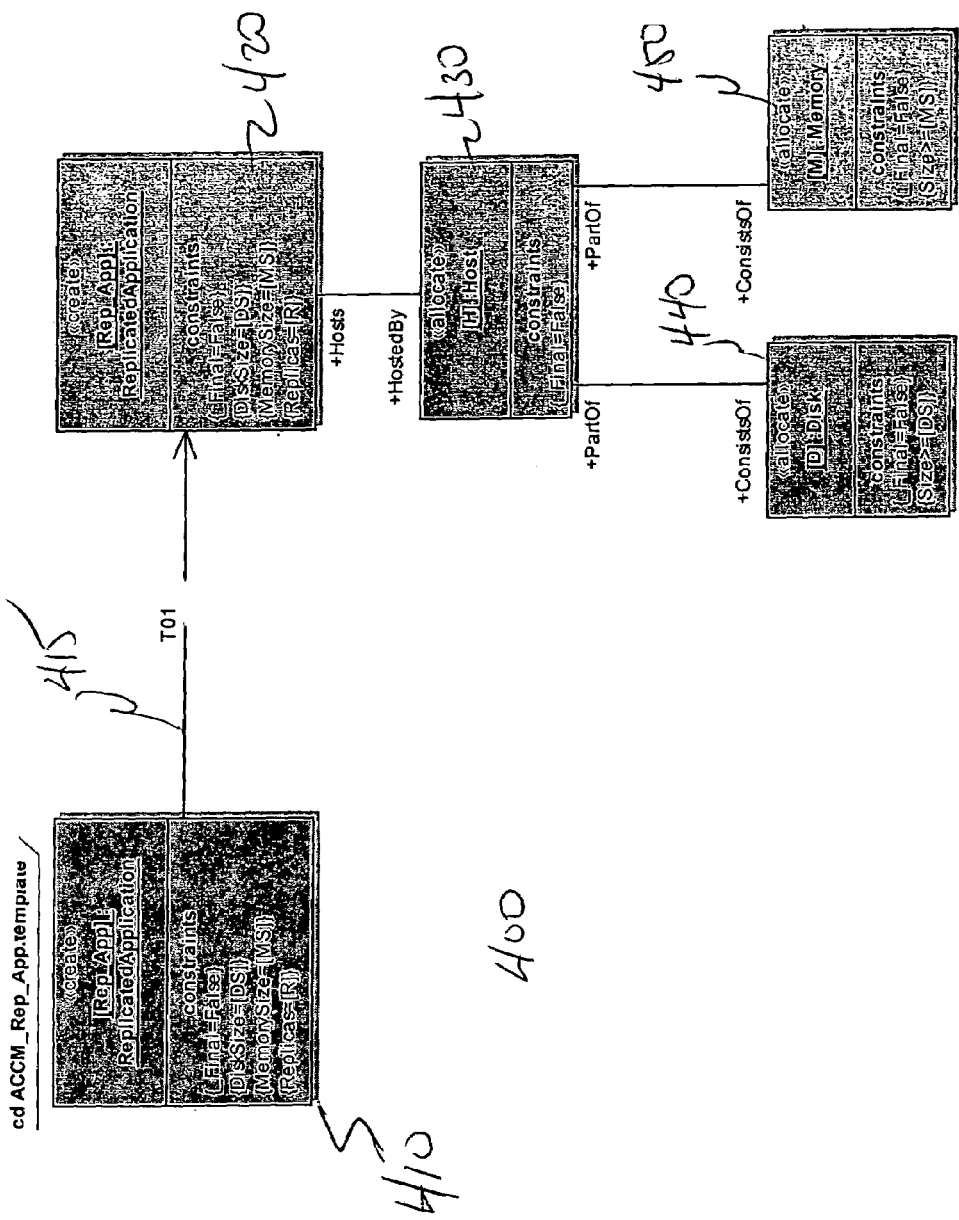
FIG. 4A illustrates an exemplary representation of change generator of the present invention.

FIG. 4A illustrates an exemplary object template representation of an operation associated with the change procedure generator in accordance with the principles of the invention. In this exemplary representation, an object template 410 represents and contains information or attributes of an application, such as the amount of disk space and the amount of memory required to host an application. The object template may receive information associated with changes desired to be made to the complex. For example, a user may enter information associated with a desired change to edit or update or duplicate an existing entity or create a new entity. The user may be presented with a graphic user interface (GUI) that allows entry of data associated with Object template 410. In this illustrated case, Object template 410 is associated with replicating an existing object and as such information regarding the disk space, i.e., {DiskSize=[DS]} and memory {MemorySize=[MS]} are entries or constraints that are needed to replicate an object, e.g., an application.

Object template 410 may, through an operation object represented as T01, 415, be presented as an object 420 hosted on a server, represented by Host object 430. In this case, the associated server includes a disk component and memory component, which are logically represented by Disk object 440 and Memory object 450. In this illustrated case, Disk object 440 includes a constraint {Size>=[DS]} and Although the present invention has been illustrated with regard to a replication function, it would be understood that operation object T01, 415, may represent operations such as "create," "delete," "update," "edit," and "deploy."

FIG. 4B illustrates, in an exemplary pseudo-language computer implementation 460 of the objects represented in FIG. 4A. In this case, the object 215 is represented by template object 410 as LHS possessing a "create" operation attribute and constraint attributes "_Final," "DiskSize," "MemorySize" and "Replicas." The attribute "_Final" represents a flag or indicator that indicates the specific operation has been completed. In this case, "_Final" is initialized at being "False" indicating that the operation has not been completed. Attributes "DiskSize" and "MemorySize" are associated with the disk space and memory size, respectively, required for the desired operation. Also shown, and represented as RHS are the objects Host 430, Disk 440 and Memory 450, each possessing an "allocate" operation attribute or constraint.

The systems and methods of the present invention may be embodied in other specific forms without departing from the teachings or essential characteristics of the invention. The described embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A system for managing a complex, the system comprising:
   a reference model store subsystem providing a reference model describing the complex, the complex comprising a collection of physical components under common administration in a network wherein the reference model store subsystem includes a representation of interconnections between the physical components and end devices within the network; wherein the reference model store subsystem further comprises a representation of the physical components comprising a set of attributes that describe the identity, nature, and operational state of the physical components which it describes;
   a reference model generation subsystem wherein the reference model generation subsystem modifies the reference model to generate a proposed reference model; and
   a change procedure generator subsystem coupled to the reference model store subsystem, wherein the change procedure generator subsystem provides a procedure comprising the steps of:
   comparing the reference model to the proposed reference model to discern the differences between them; and
   determining an ordered list of one or more changes between said reference model and said proposed reference model required to transform a complex as represented by a reference model into a complex as represented by the proposed reference model, wherein said one or more changes are characterized by a type of change to be made and a status of the change to be made.

2. The system as recited in claim 1, wherein the reference model generation subsystem includes a plurality of object templates associated with desired change operations, each of the object templates providing instructions to transform the complex as represented by the reference model into a complex represented by the proposed reference model.

3. A method of managing a complex, the method comprising the steps of:
   selecting a reference model representative describing the complex, the complex comprising a collection of physical components under common administration in a network wherein the reference model store subsystem includes a representation of interconnections between the physical components and end devices within the network; wherein the reference model store subsystem further comprises a representation of the physical components comprising a set of attributes that describe the identity, nature, and operational state of the physical components which it describes;
   generating a proposed reference model by modifying the reference model;
   comparing the reference model to the proposed reference model to discern the differences between them;
   providing a change procedure describing an ordered list of at least one change desired to transform a complex as represented by the reference model into a complex as represented by a proposed reference model, wherein said at least one change is characterized by a type of change to be made and a status of the change to be made; and
   implementing the at least one changes required to transform the complex as represented by the operational model into the complex as represented by the proposed reference model.

4. The method as recited in claim 3, wherein the step of generating a proposed reference model comprises the step of:
   associating desired change operations with a corresponding object template, each of the object templates providing instructions to transform the complex as represented by the reference model into a complex represented by the proposed reference model.

* * * * *